United States Patent
Sajassi et al.

(10) Patent No.: US 12,081,529 B2
(45) Date of Patent: Sep. 3, 2024

(54) SYSTEM AND METHOD FOR ADAPTIVE ENCRYPTION FOR SD-WAN

(71) Applicant: Cisco Technology, Inc., San Jose, CA (US)

(72) Inventors: Ali Sajassi, San Ramon, CA (US); Pradeep Kumar Kathail, Los Altos, CA (US); Samir Thoria, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 229 days.

(21) Appl. No.: 17/812,901

(22) Filed: Jul. 15, 2022

(65) Prior Publication Data

US 2024/0022548 A1    Jan. 18, 2024

(51) Int. Cl.
*H04L 29/06* (2006.01)
*H04L 9/40* (2022.01)
*H04L 45/00* (2022.01)

(52) U.S. Cl.
CPC .......... *H04L 63/0435* (2013.01); *H04L 45/22* (2013.01); *H04L 63/029* (2013.01)

(58) Field of Classification Search
CPC ... H04L 63/0435; H04L 45/22; H04L 63/029; H04L 63/0272; H04L 63/164
See application file for complete search history.

(56) References Cited

U.S. PATENT DOCUMENTS

| 2005/0125657 | A1  | 6/2005 | Haight |
| 2009/0207740 | A1  | 8/2009 | Crotti et al. |
| 2021/0006589 | A1* | 1/2021 | Kohout ............... H04L 63/0428 |
| 2021/0144075 | A1  | 5/2021 | Indiresan et al. |

FOREIGN PATENT DOCUMENTS

CN    113472751 A    10/2021

OTHER PUBLICATIONS

Rawat et al., "Designing a Header Compression Mechanism for Efficient Use of IP Tunneling in Wireless Networks", f IEEE Communications Society subject matter experts for publication in the IEEE CCNC 2010 proceedings, (Year: 2010).*
Shojaee et al., "SafeGuard: Congestion and Memory-aware Failure Recovery in SD-WAN", 2020 16th International Conference on Network and Service Management (CNSM), Nov. 2020.*

* cited by examiner

*Primary Examiner* — Morshed Mehedi
(74) *Attorney, Agent, or Firm* — Baker Botts L.L.P.

(57) ABSTRACT

A system and method for adaptive encryption for SD-WAN includes identifying an encrypted conversational flow and determining whether a duration of the encrypted conversational flow exceeds a threshold. The method also includes selecting a header-less tunnel for the encrypted conversational flow when the duration is more than the threshold. The method further includes transmitting the encrypted conversational flow to an egress router over the selected header-less tunnel.

20 Claims, 5 Drawing Sheets

SYSTEM AND METHOD FOR ADAPTIVE ENCRYPTION FOR SD-WAN

TECHNICAL FIELD

The present disclosure relates generally to software-defined wide area networks (SD-WANs) and mobile networks, and more particularly to adaptive encryption for SD-WAN.

BACKGROUND

Currently, much of today's Internet traffic and inter-site enterprise traffic are encrypted between clients and servers. As a result, when such traffic is sent over an SD-WAN network, the traffic does not need to be encrypted a second time. Double encryption results when such traffic is encrypted again, and double encryption results in degradation of performance and a decrease in throughput and link-bandwidth.

DESCRIPTION OF EXAMPLE EMBODIMENTS

Overview

Figure 1:
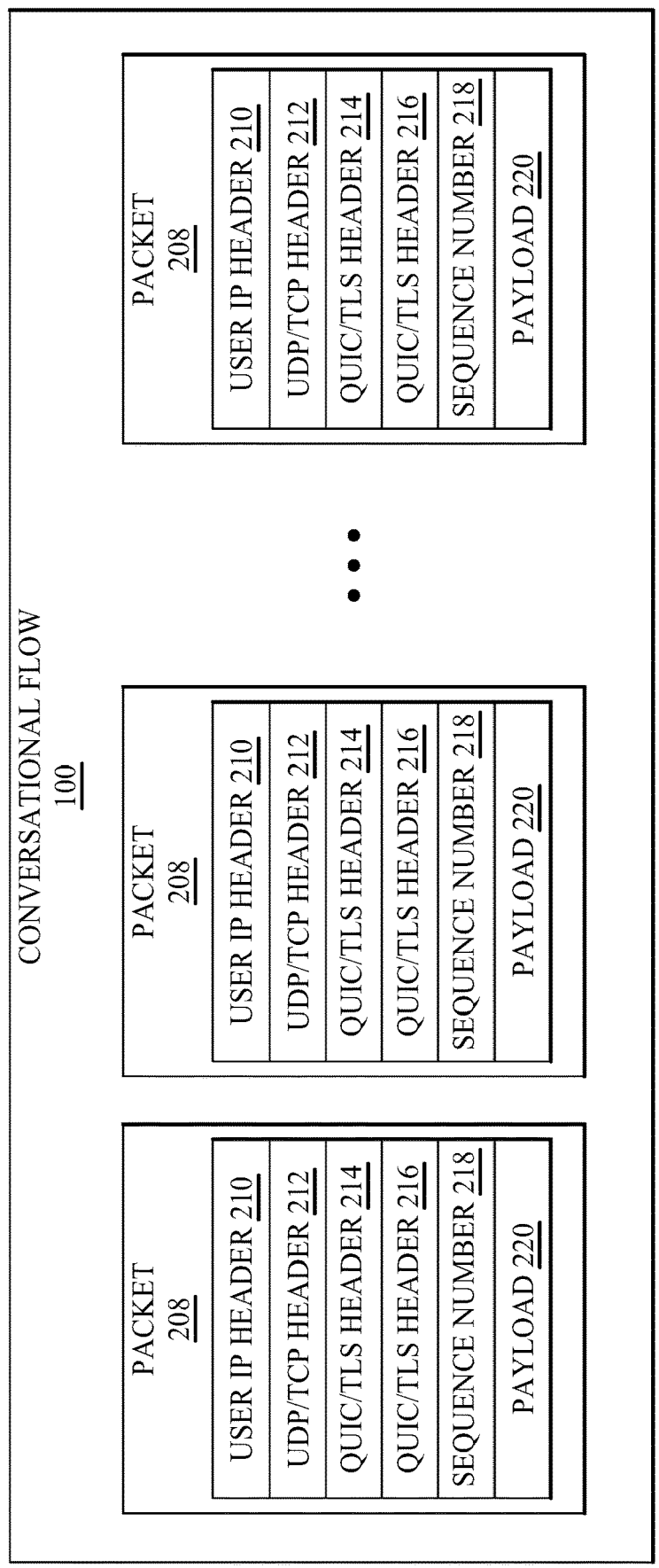
FIG. 1 is a block diagram illustrating an example conversational flow.

According to an embodiment, a system includes one or more processors and one or more computer-readable non-transitory storage media coupled to the one or more processors. The one or more computer-readable non-transitory storage media include instructions that, when executed by the one or more processors, cause the router to perform operations including identifying an encrypted conversational flow. The operations also include determining whether a duration of the encrypted conversational flow exceeds a threshold. The operations further include selecting a header-less tunnel for the encrypted conversational flow when the duration is more than the threshold and transmitting the encrypted conversational flow to an egress router over the selected header-less tunnel.

In certain embodiments, the operations may include selecting an SD-WAN IPsec tunnel for the encrypted conversational flow when the duration is not more than the threshold and transmitting the encrypted conversational flow to the egress router over the selected SD-WAN IPsec tunnel. The operations may also include starting a flow-longevity timer when the encrypted conversational flow is received and marking, if the flow-longevity timer expires while the encrypted conversational flow is still active, the encrypted conversational flow as long duration. In some embodiments, the operations may include transmitting the encrypted conversational flow to a backup egress router.

In certain embodiments, the operations may include transmitting one or more packets of the encrypted conversational flow over an SD-WAN IPsec tunnel prior to determining whether the encrypted conversational flow exceeds the threshold. In certain embodiments, the operations may include removing one or more unencrypted fields from a packet of the encrypted conversational flow prior to sending the encrypted conversational flow to the egress router and transmitting the one or more unencrypted fields to the egress router over an SD-WAN IPsec tunnel. The operations may further include associating the one or more unencrypted fields with the packet using a unique identifier stored at the egress router and a backup egress router and adding, by the egress router, the one or more unencrypted fields to the packet based on the unique identifier.

According to another embodiment, a method includes identifying an encrypted conversational flow. The method also includes determining whether a duration of the encrypted conversational flow exceeds a threshold. The method further includes selecting a header-less tunnel for the encrypted conversational flow when the duration is more than the threshold and transmitting the encrypted conversational flow to an egress router over the selected header-less tunnel.

According to yet another embodiment, one or more computer-readable non-transitory storage media embody instructions that, when executed by a processor, cause the processor to perform operations including identifying an encrypted conversational flow. The operations also include determining whether a duration of the encrypted conversational flow exceeds a threshold. The operations further include selecting a header-less tunnel for the encrypted conversational flow when the duration is more than the threshold and transmitting the encrypted conversational flow to an egress router over the selected header-less tunnel.

Technical advantages of certain embodiments of this disclosure may include one or more of the following. Embodiments of this disclosure identify encrypted conversational flows and send the encrypted conversational flows over a header-less tunnel. Sending already-encrypted conversational flows over a header-less tunnel instead of an SD-WAN IPsec tunnel may create operational advantages and cost efficiencies. For example, sending already-encrypted conversational flows over a header-less tunnel results in improved performance and throughput/link-bandwidth.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

FIG. 1 is a block diagram illustrating an example conversational flow. In the illustrated embodiment, conversational flow 100 includes a plurality of packets 208. Conversational flow 100 represents the communications that occurs between various endpoints and components within a network. Packets 208 of conversational flow 100 are formatted units of data.

In certain embodiments, packets 208 include control information and user data. In some embodiments, control information provides data for delivering a payload 220. For example, the control information may include a source network address, a destination network address, an error detection code, a security parameter (e.g., a security parameter index (SPI)), sequencing information (e.g., a sequence number 218), integrity check information (e.g., an integrity check value (ICV)), and the like. In certain embodiments, the control information is in the header and/or trailer of packets 208. The control information of packets 208 may be used to uniquely identify dropped or lost packets 208. In the illustrated embodiment, packets 208 contain a User Internet Protocol (IP) header 210, a User Data Protocol (UDP)/ Transmission Control Protocol (TCP) header 212, and a payload 220. User IP header 210 represents information used to route packet 208 through network 200. For example, user IP header 210 may include an IP version number, a source IP address, and a destination IP address. UDP/TCP header 212 represents information used to route packet 208 through network 200. For example, UDP/TCP header 212 may contain a source port number, a destination port number, a sequence number, and an acknowledgement number. Payload 220 represents the data being transported by packet 208 in network 200.

In the illustrated embodiments, packets 208 are Quick UDP Internet Connections (QUIC) or Transport Layer Security (TLS) encrypted and may contain one or more QUIC/TLS headers 214 and 216. QUIC/TLS headers 214 and 216 represent information about the encryption of packet 208 using either QUIC or TLS. For example, QUIC/TLS headers 214 and 216 may include a version number and a length value.

Conversational flow 100 may be active while packets 208 of conversational flow 100 are still being transmitted. As another example, conversational flow 100 may be a long duration. Conversational flow 100 has a long duration when it is active for a length of time that exceeds a threshold value. An administrator may set the threshold value, the network may adjust the threshold value based on traffic flow, or any other suitable activity may cause the threshold value to change.

Although FIG. 1 illustrates a particular number of conversational flows 100 and packets 208, this disclosure contemplates any suitable number of conversational flows 100 and packets 208. Additionally, conversational flow 100 and packets 208 may be arranged in any suitable manner.

Figure 2:
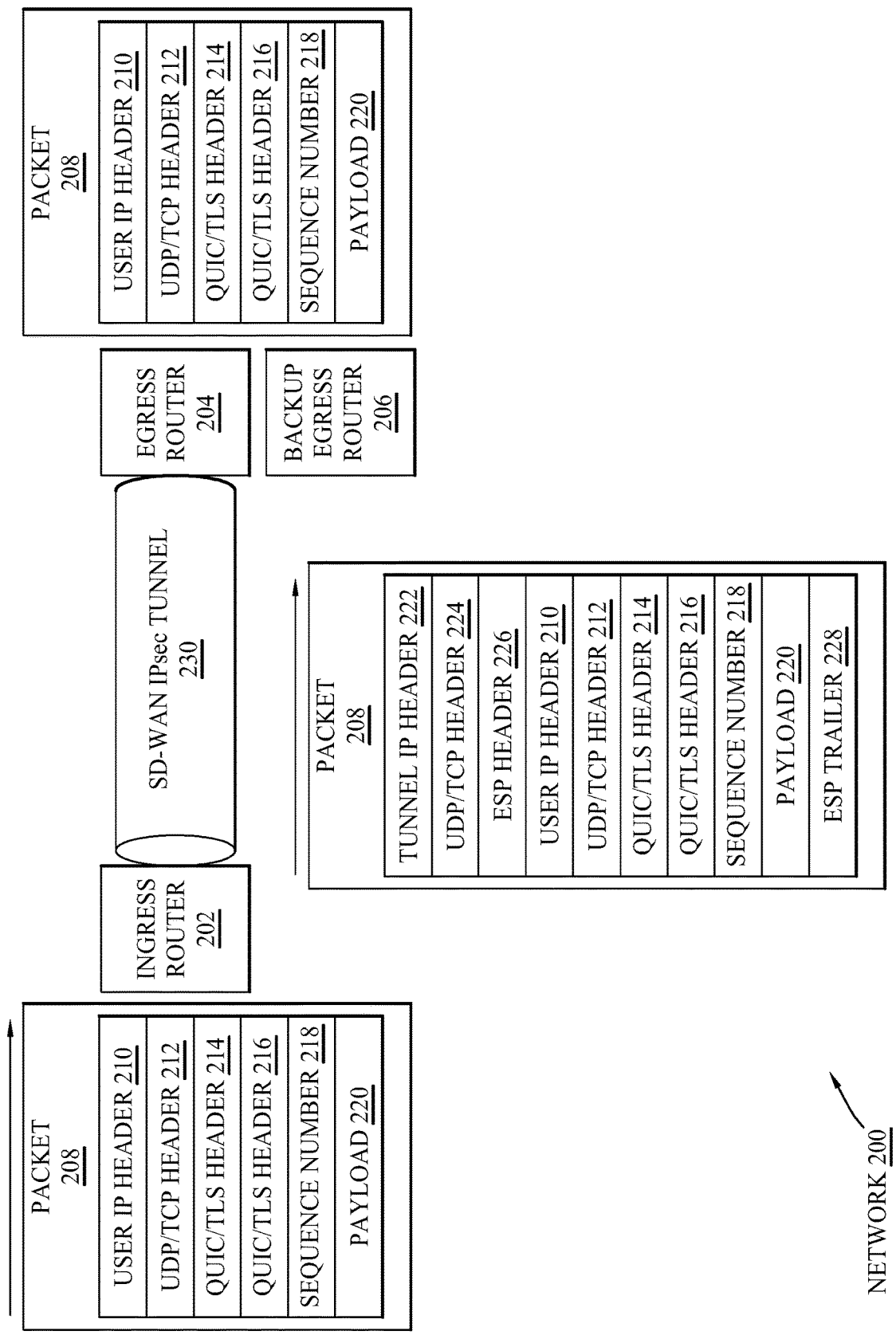
FIG. 2 illustrates a network 200 that facilitates adaptive encryption for SD-WAN.

FIG. 2 illustrates a network 200 that facilitates adaptive encryption for SD-WAN. In the illustrated embodiment, network 200 includes ingress router 202, egress router 204, backup egress router 206, packets 208, and SD-WAN IP Security (IPsec) tunnel 230. Network 200 is an SD-WAN network that facilitates communication between components within network 200. For example, network 200 may connect one or more components (e.g., ingress router 202, egress router 204, and backup egress router 206).

Ingress router 202 of network 200 is a router that resides at an edge of or a boundary of network 200 (e.g., an SD-WAN network). In certain embodiments, ingress router 202 uses static and/or dynamic routing to send data to other nodes of network 200. Ingress router 202 may include one or more hardware devices, one or more servers that include routing software, and the like. Ingress router 202 may include a processor, a memory, a storage, and a network interface.

Egress router 204 of network 200 is a router that resides at an edge of or a boundary of network 200 (e.g., an SD-WAN network). In certain embodiments, egress router 204 uses static and/or dynamic routing to receive data from other nodes of network 200. Egress router 204 may include one or more hardware devices, one or more servers that include routing software, and the like. Egress router 204 may include a processor, a memory, a storage, and a network interface.

Backup egress router 206 of network 200 is a router that resides at an edge of or a boundary of network 200 (e.g., an SD-WAN network). In certain embodiments, backup egress router 206 may be located in proximity to egress router 204.

In certain embodiments, backup egress router 206 uses static and/or dynamic routing to send and receive data from other nodes of network 200. Backup egress router 206 may include one or more hardware devices, one or more servers that include routing software, and the like. Backup egress router 206 may include a processor, a memory, a storage, and a network interface.

SD-WAN IPsec tunnel 230 of network 200 uses IPsec to encapsulate packet 208. For example, packet 208 of network 200 is received as a part of conversational flow 100. Packet 208 is a formatted unit of data carried by network 200. In certain embodiments, packet 208 includes control information and user data. In some embodiments, control information provides data for delivering payload 220. For example, the control information may include a source network address, a destination network address, an error detection code, a security parameter (e.g., a security parameter index (SPI)), sequencing information (e.g., a sequence number 218), integrity check information (e.g., an integrity check value (ICV)), and the like. In certain embodiments, the control information is in the header and/or trailer of packet 208. The control information of packet 208 may be used to uniquely identify dropped or lost packets 208. In certain embodiments, packet 208 contains User IP header 210, UDP/TCP header 212, and payload 220. In certain embodiments, packet 208 is QUIC or TLS encrypted and may contain one or more QUIC/TLS headers 214 and 216.

In an exemplary embodiment of operation, ingress router 202 receives conversational flow 100 containing packets 208 and identifies conversational flow 100 as encrypted. Ingress router 202 determines whether the duration of conversational flow 100 exceeds a threshold value. If the duration of conversational flow 100 exceeds the threshold value, ingress router 202 marks conversational flow 100. For example, ingress router 202 may mark conversational flow 100 as having a long duration if the duration of the flow exceeds the threshold value. In an exemplary embodiment, to determine whether conversational flow 100 exceeds the threshold value, ingress router 202 starts a flow-longevity timer when it receives conversational flow 100. If the flow-longevity timer expires and conversational flow 100 is still active, ingress router 202 marks conversational flow 100 as long duration. For example, conversational flow 100 may be marked as long duration by indicating the flow is long-duration within the header of conversational flow 100. Alternatively, if conversational flow 100 is not active when the flow-longevity timer expires, conversational flow 100 is not marked as long duration. If conversational flow 100 is not long duration, ingress router 202 selects SD-WAN IPsec tunnel 230 and transmits packets 208 of conversational flow 100 to egress router 204 over SD-WAN IPsec tunnel 230. In one embodiment, ingress router 202 may instead transmit packets 208 of conversational flow 100 to backup egress router 206 over SD-WAN IPsec tunnel 230. In certain embodiments, ingress router 202 may transmit one or more packets 208 of conversational flow 100 to egress router 204 over SD-WAN IPsec tunnel 230 prior to determining whether conversational flow 100 exceeds the threshold.

In certain embodiments, SD-WAN IPsec tunnel 230 of network 200 adds security services to the IP layer in a way that is compatible with IPv4 and IPv6 standards. SD-WAN IPsec tunnel 230 may encrypt the header of packets 208 and/or the payload of packets 208. In certain embodiments, tunnel IP header 222 is appended to packet 208. Tunnel IP header 222 may contain information used to route packet 208 through network 200. For example, tunnel IP header 222 may contain a source address and a destination address of packet 208. In certain embodiments, UDP/TCP header 224 is appended to packet 208. UDP/TCP header 224 may contain information used to route packet 208 through network 200. For example, UDP/TCP header 224 may contain a source port number, a destination port number, a sequence number, and an acknowledgement number. In some embodiments, SD-WAN IPsec tunnel 230 implements Encapsulating Security Payload (ESP). ESP header 226 and ESP trailer 228 may be appended to packet 208. ESP header 226 and ESP trailer 228 may contain information necessary to implement ESP. The ESP may include six parts. The first part is a Security Parameter Index (SPI), which is an arbitrary 32-bit number that tells the device receiving packets 208 what group of security protocols the sender is using for communication. The second part is sequence number 218, which is a counter that is incremented by one each time a packet is sent to the same address and uses the same SPI. Sequence numbers 218 may be used to identify packet 208. Sequence numbers 218 may indicate how many packets 208 have been sent with the same group of parameters. In certain embodiments, sequence numbers 218 protect against replay attacks. A replay attack is a form of network attack in which a valid data transmission is maliciously or fraudulently repeated or delayed. For example, a replay attack may involve an attacker who copies packet 208 and sends packet 208 out of sequence to confuse communicating devices.

In certain embodiments, the first and second parts of the ESP are not encrypted (but may be authenticated). The remaining four parts of the ESP may be encrypted during transmission across network 200. The third part of the ESP is the payload 220, which is the actual data that is carried by packet 208. The fourth part of the ESP is the padding, which may range from 0 to 255 bytes of data and may allow certain types of encryption algorithms to require the data to be a multiple of a certain number of bytes. The fifth part of the ESP is the pad length field, which specifies how much of the payload 220 is padding rather than data. The sixth part of the ESP is the next header field, which identifies the type of data carried and the protocol.

Although FIG. 2 illustrates a particular number of networks 200, ingress routers 202, egress routers 204, backup egress routers 206, packets 208, and SD-WAN IPsec tunnels 230, this disclosure contemplates any suitable number of networks 200, ingress routers 202, egress routers 204, backup egress routers 206, packets 208, and SD-WAN IPsec tunnels 230. Additionally, this disclosure contemplates any suitable arrangement of network 200, ingress router 202, egress router 204, backup egress router 206, packet, 208, and SD-WAN IPsec tunnel 230. Additionally, this disclosure contemplates any suitable combination of any suitable components, devices, or systems carrying out any suitable actions.

Figure 3:
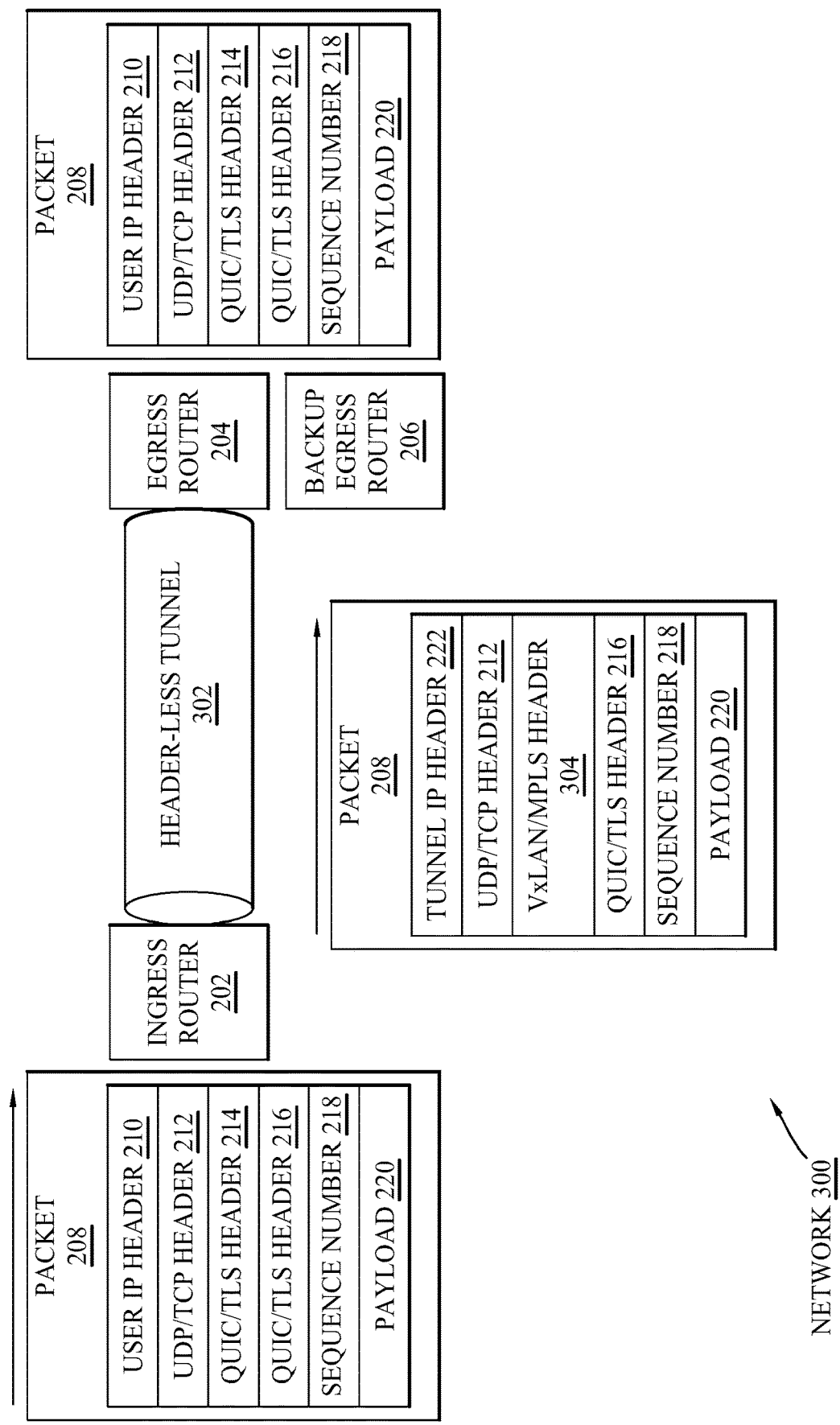
FIG. 3 illustrates a network 300 that facilitates adaptive encryption for SD-WAN.

FIG. 3 illustrates a network 300 that facilitates adaptive encryption for SD-WAN. In the illustrated embodiment, network 300 includes ingress router 202, egress router 204, packets 208, backup egress router 206, and header-less tunnel 302. Network 300 is an SD-WAN network that facilitates communication between components within network 300. For example, network 300 may connect one or more components (e.g., ingress router 202, egress router 204, and backup egress router 206).

Ingress router 202 of network 300 is a router that resides at an edge of or a boundary of network 300 (e.g., an SD-WAN network). In certain embodiments, ingress router 202 uses static and/or dynamic routing to send data to other nodes of network 300. Ingress router 202 may include one or more hardware devices, one or more servers that include routing software, and the like. Ingress router 202 may include a processor, a memory, a storage, and a network interface.

Egress router 204 of network 300 is a router that resides at an edge of or a boundary of network 300 (e.g., an SD-WAN network). In certain embodiments, egress router 204 uses static and/or dynamic routing to receive data from other nodes of network 300. Egress router 204 may include one or more hardware devices, one or more servers that include routing software, and the like. Egress router 204 may include a processor, a memory, a storage, and a network interface.

Backup egress router 206 of network 300 is a router that resides at an edge of or a boundary of network 300 (e.g., a SD-WAN network). In certain embodiments, backup egress router 206 may be located in proximity to egress router 204. In certain embodiments, backup egress router 206 uses static and/or dynamic routing to send and receive data from other nodes of network 300. Backup egress router 206 may include one or more hardware devices, one or more servers that include routing software, and the like. Backup egress router 206 may include a processor, a memory, a storage, and a network interface.

Header-less tunnel 302 of network 300 encapsulates packet 208 as packet 208 is routed through network 300. Header-less tunnel 302 may use one of a variety of encapsulation protocols for encapsulating packet 208. For example, in some embodiments header-less tunnel 302 may use VxLAN encapsulation protocol, while in other embodiments header-less tunnel 302 may use multiprotocol label switching (MPLS). In certain embodiments, packet 208 of network 200 is received as a part of conversational flow 100. Packet 208 is a formatted unit of data carried by network 200. In certain embodiments, packet 208 includes control information and user data. In some embodiments, control information provides data for delivering payload 220. For example, the control information may include a source network address, a destination network address, an error detection code, a security parameter (e.g., a security parameter index (SPI)), sequencing information (e.g., a sequence number 218), integrity check information (e.g., an integrity check value (ICV)), and the like. In certain embodiments, the control information is in the header and/or trailer of packet 208. The control information of packet 208 may be used to uniquely identify dropped or lost packets 208. In certain embodiments, packet 208 contains User IP header 210, UDP/TCP header 212, and payload 220. In certain embodiments, packet 208 is QUIC or TLS encrypted and may contain one or more QUIC/TLS headers 214 and 216. In certain embodiments, packet 208 may contain VxLAN/MPLS header 304. VxLAN/MPLS header 304 represents information for encapsulating packet 208 using VxLAN protocol or MPLS.

In an exemplary embodiment of operation, ingress router 202 receives conversational flow 100 containing packets 208 and identifies conversational flow 100 as encrypted. Ingress router 202 determines whether the duration of conversational flow 100 exceeds a threshold value. If the duration of conversational flow 100 exceeds the threshold value, ingress router 202 marks conversational flow 100. For example, ingress router 202 may mark conversational flow 100 as having a long duration if the duration of the flow exceeds the threshold value. In an exemplary embodiment, to determine whether conversational flow 100 exceeds the threshold value, ingress router 202 starts a flow-longevity timer when it receives conversational flow 100. If the flow-longevity timer expires and conversational flow 100 is still active, ingress router 202 marks conversational flow 100 as long duration. For example, conversational flow 100 may be marked as long duration by indicating the flow is long-duration within the header of conversational flow 100. Alternatively, if conversational flow 100 is not active when the flow-longevity timer expires, conversational flow is not marked as long duration. If conversational flow 100 is long duration, ingress router 202 selects header-less tunnel 302 and transmits packets 208 of conversational flow 100 to egress router 204 over header-less tunnel 302. In one embodiment, ingress router 202 may instead transmit packets 208 of conversational flow 100 to backup egress router 206 over header-less tunnel 302. In certain embodiments, ingress router 202 may remove one or more unencrypted fields from packet 208 prior to transmitting packet 208 over header-less tunnel 302. The unencrypted fields may be transmitted to egress router 204 over SD-WAN IPsec tunnel 230. In certain other embodiments, egress router 204 may associate the unencrypted fields with packet 208 using a unique identifier stored at egress router 204 and backup egress router 206. Egress router 204 may signal the unique identifier to ingress router 202. Upon receiving packet 208, egress router 204 may add the unencrypted fields back to packet 208 based on the unique identifier.

Although FIG. 3 illustrates a particular number of networks 300, ingress routers 202, egress routers 204, backup egress routers 206, packets 208, and header-less tunnels 302, this disclosure contemplates any suitable number of networks 300, ingress routers 202, egress routers 204, backup egress routers 206, packets 208, and header-less tunnels 302. Additionally, this disclosure contemplates any suitable arrangement of network 200, ingress router 202, egress router 204, backup egress router 206, packet, 208, and header-less tunnel 302. Additionally, this disclosure contemplates any suitable combination of any suitable components, devices, or systems carrying out any suitable actions.

Figure 4:
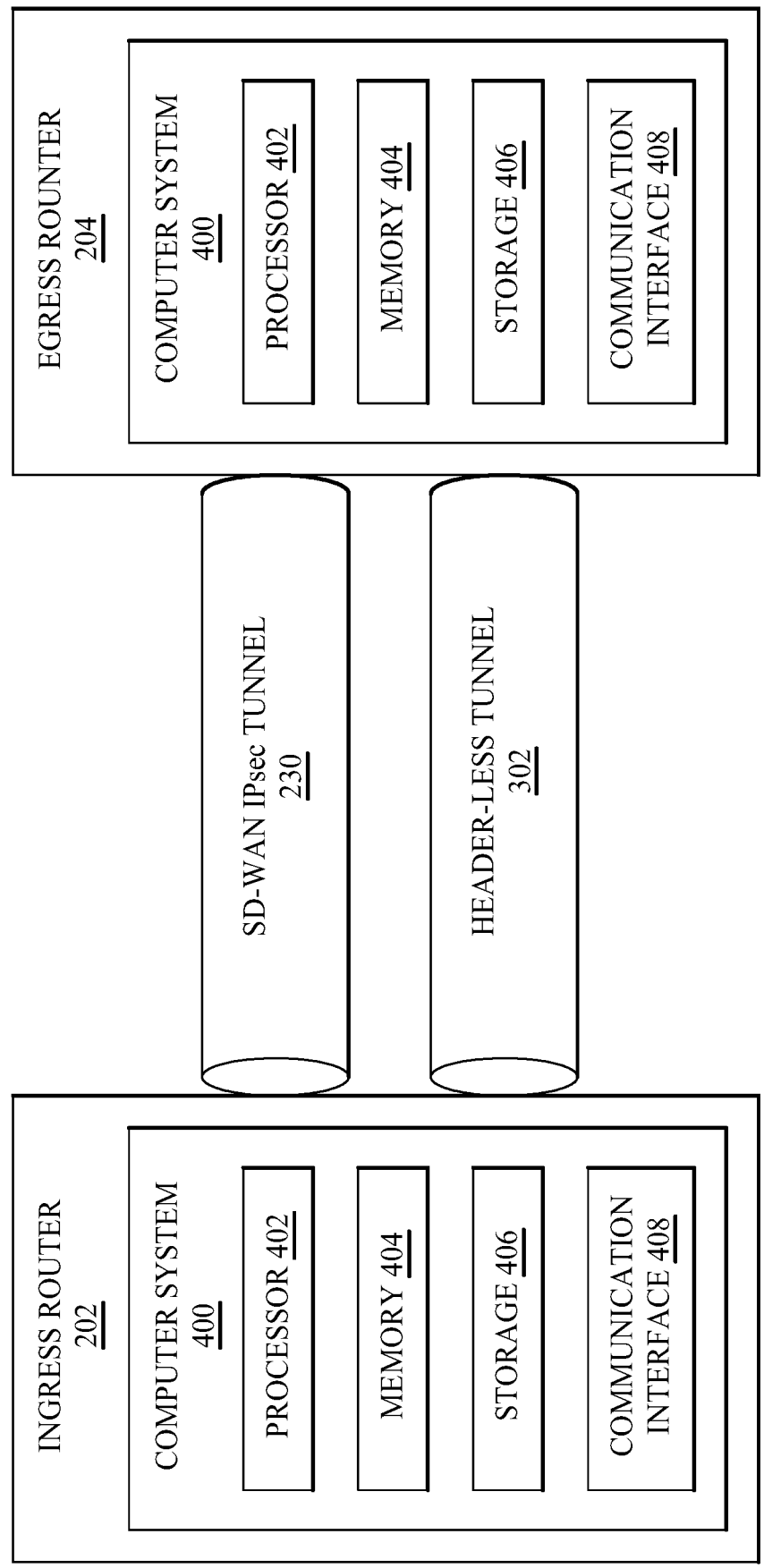
FIG. 4 illustrates an example system for providing adaptive encryption for SD-WAN.

FIG. 4 illustrates an example system for providing adaptive encryption for SD-WAN. The illustrated embodiment includes ingress router 202, egress router 204, SD-WAN IPsec tunnel 230, and header-less tunnel 302.

Ingress router 202 of the illustrated embodiment is a router that resides at an edge of or a boundary of a network (e.g., an SD-WAN network). In certain embodiments, ingress router 202 uses static and/or dynamic routing to send data to other nodes of the network. Ingress router 202 includes computer system 400.

Egress router 204 of the illustrated embodiment is a router that resides at an edge of or a boundary of a network (e.g., an SD-WAN network). In certain embodiments, egress router 204 uses static and/or dynamic routing to receive data from other nodes of the network. Egress router 204 includes computer system 400.

In exemplary embodiments, computer system 400 includes a processor 402, memory 404, storage 406, and a communication interface 408. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, communication interface 408 includes hardware, software, or both providing one or more interfaces for communication (such as, for example, packet-based communication) between computer system 400 and one or more other computer systems 400 or one or more networks. As an example and not by way of limitation, communication interface 408 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 408 for it. As an example and not by way of limitation, computer system 400 may communicate with an ad hoc network, a personal area network (PAN), a local area network (LAN), a wide area network (WAN), a metropolitan area network (MAN), a SD-WAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 408 for any of these networks, where appropriate. Communication interface 408 may include one or more communication interfaces 408, where appropriate. Although this disclosure describes and illustrates a particular communication interface, this disclosure contemplates any suitable communication interface.

Although FIG. 4 illustrates a particular number of ingress routers 202, egress routers 204, SD-WAN IPsec tunnels 230, header-less tunnels 302, and computer systems 400, this disclosure contemplates any suitable number of ingress routers 202, egress routers 204, SD-WAN IPsec tunnels 230, header-less tunnels 302, and computer systems 400. Additionally, this disclosure contemplates any suitable arrangement of ingress router 202, egress router 204, SD-WAN IPsec tunnel 230, header-less tunnel 302, and computer systems 400. Additionally, this disclosure contemplates any suitable combination of any suitable components, devices, or systems carrying out any suitable actions.

Figure 5:
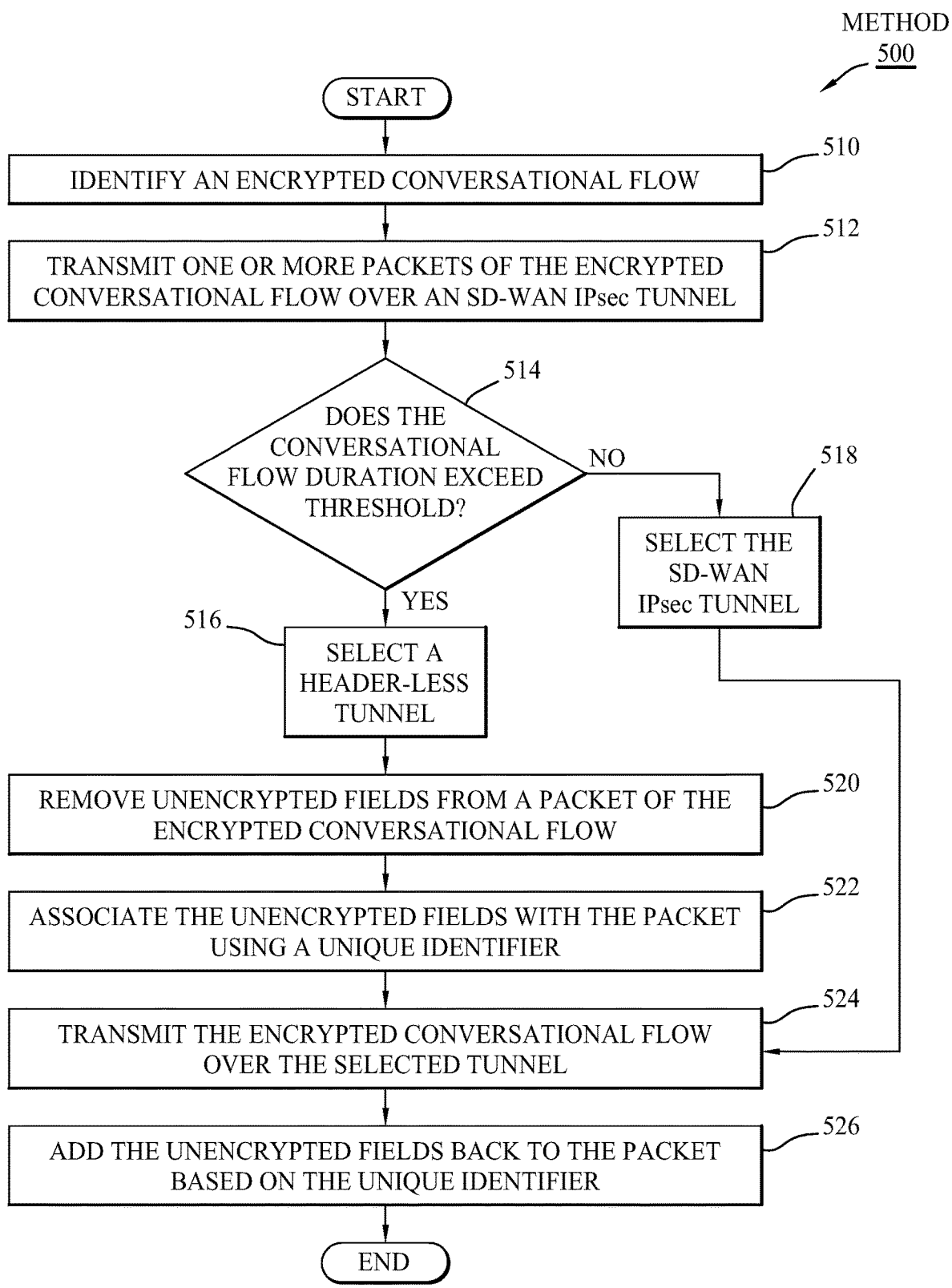
FIG. 5 illustrates an example method 500 for performing adaptive encryption in an SD-WAN network.

FIG. 5 illustrates an example method 500 for performing adaptive encryption in an SD-WAN network. Method 500 begins at step 510. At step 510, an ingress router (e.g., ingress router 202 of FIG. 2) identifies an encrypted conversational flow (e.g., conversational flow 100 of FIG. 1). For example, the ingress router may identify a conversational flow encrypted using QUIC encryption. As another example, the ingress router may identify a conversational flow encrypted using TLS encryption. Method 500 then moves from step 510 to step 512.

At step 512, the ingress router transmits one or more packets (e.g., packets 208 of FIG. 2) of the encrypted conversational flow to an egress router (e.g., egress router 204 or backup egress router 206 of FIG. 2) over an SD-WAN IPsec tunnel (e.g., SD-WAN IPsec tunnel 230 of FIG. 2).

At step 514, the ingress router determines if the conversational flow duration exceeds a threshold value. For example, ingress router may determine if the conversational flow exceeds the threshold value by starting a flow-longevity timer equal to the threshold value when the conversational flow is received. If the flow-longevity timer expires while the conversational flow is still active, the conversational flow exceeds the threshold value. If the ingress router determines that the conversational flow duration exceeds the threshold value, method 500 moves from step 514 to step 516. If the ingress router determines that the conversational flow duration is less than the threshold value, method 500 moves from step 514 to step 518.

If, at step 514, the ingress router determines that the conversational flow exceeds the threshold value, method 500 moves from step 514 to step 516, where the ingress router selects a header-less tunnel (e.g., header-less tunnel 302 of FIG. 3) over which to transmit one or more packets of the conversational flow. Method 500 then moves from step 516 to step 520.

If, at step 514, the ingress router determines that the conversational flow does not exceed the threshold value, method 500 moves from step 514 to step 518, where the ingress router selects an SD-WAN IPsec tunnel over which to transmit the one or more packets of the conversational flow. Method 500 then moves from step 518 to step 524.

At step 520, the ingress router removes one or more unencrypted fields from a packet of the conversational flow. Method 500 then moves from step 520 to step 522.

At step 522, the egress router associates the one or more unencrypted fields with the packet using a unique identifier. Method 500 then moves from step 522 to step 524.

At step 524, the ingress router transmits the encrypted conversational flow over the header-less tunnel or SD-WAN IPsec tunnel selected at steps 516 or 518. Method 500 then moves from step 524 to step 526.

At step 526, the egress router adds the unencrypted fields back to the packet based on the unique identifier. Method 500 ends at step 526.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media comprising instructions that, when executed by the one or more processors, cause one or more components of the system to perform operations comprising:
identifying an encrypted conversational flow;
determining whether a duration of the encrypted conversational flow exceeds a threshold;
selecting a header-less tunnel for the encrypted conversational flow when the duration is more than the threshold; and
transmitting the encrypted conversational flow to an egress router over the selected header-less tunnel.

2. The system of claim 1, the operations further comprising:
selecting an SD-WAN IPsec tunnel for the encrypted conversational flow when the duration is not more than the threshold; and
transmitting the encrypted conversational flow to the egress router over the selected SD-WAN IPsec tunnel.

3. The system of claim 1, wherein the operation of determining whether a duration of the encrypted conversational flow exceeds a threshold comprises:
starting a flow-longevity timer when the encrypted conversational flow is received; and
marking, if the flow-longevity timer expires while the encrypted conversational flow is still active, the encrypted conversational flow as long duration.

4. The system of claim 1, wherein the operation of transmitting the encrypted conversational flow to the egress router comprises transmitting the encrypted conversational flow to a backup egress router.

5. The system of claim 1, the operations further comprising:
transmitting one or more packets of the encrypted conversational flow over an SD-WAN IPsec tunnel prior to determining whether the encrypted conversational flow exceeds the threshold.

6. The system of claim 1, the operations further comprising:
removing one or more unencrypted fields from a packet of the encrypted conversational flow prior to sending the encrypted conversational flow to the egress router.

7. The system of claim 6, the operations further comprising:
associating the one or more unencrypted fields with the packet using a unique identifier stored at the egress router and a backup egress router; and
adding, by the egress router, the one or more unencrypted fields to the packet based on the unique identifier.

8. A method, comprising:
identifying an encrypted conversational flow;
determining whether a duration of the encrypted conversational flow exceeds a threshold;
selecting a header-less tunnel for the encrypted conversational flow when the duration is more than the threshold; and
transmitting the encrypted conversational flow to an egress router over the selected header-less tunnel.

9. The method of claim 8, further comprising:
selecting an SD-WAN IPsec tunnel for the encrypted conversational flow when the duration is not more than the threshold; and
transmitting the encrypted conversational flow to the egress router over the selected SD-WAN IPsec tunnel.

10. The method of claim 8, wherein the determining step comprises:
   starting a flow-longevity timer when the encrypted conversational flow is received; and
   marking, if the flow-longevity timer expires while the encrypted conversational flow is still active, the encrypted conversational flow as long duration.

11. The method of claim 8, wherein the transmitting step comprises transmitting the encrypted conversational flow to a backup egress router.

12. The method of claim 8, further comprising:
   transmitting one or more packets of the encrypted conversational flow over an SD-WAN IPsec tunnel prior to determining whether the encrypted conversational flow exceeds the threshold.

13. The method of claim 8, further comprising:
   removing one or more unencrypted fields from a packet of the encrypted conversational flow prior to sending the encrypted conversational flow to the egress router.

14. The method of claim 13, further comprising:
   associating the one or more unencrypted fields with the packet using a unique identifier stored at the egress router and the backup egress router; and
   adding, by the egress router, the one or more unencrypted fields to the packet based on the unique identifier.

15. One or more computer-readable non-transitory storage media embodying instructions that, when executed by a processor, cause performance of operations comprising:
   identifying an encrypted conversational flow;
   determining whether a duration of the encrypted conversational flow exceeds a threshold;
   selecting a header-less tunnel for the encrypted conversational flow when the duration is more than the threshold; and
   transmitting the encrypted conversational flow to an egress router over the selected header-less tunnel.

16. The one or more computer-readable non-transitory storage media of claim 15, the operations further comprising:
   selecting an SD-WAN IPsec tunnel for the encrypted conversational flow when the duration is not more than the threshold; and
   transmitting the encrypted conversational flow to the egress router over the selected SD-WAN IPsec tunnel.

17. The one or more computer-readable non-transitory storage media of claim 15, wherein the operation of determining whether a duration of the encrypted conversational flow exceeds a threshold comprises:
   starting a flow-longevity timer when the encrypted conversational flow is received; and
   marking, if the flow-longevity timer expires while the encrypted conversational flow is still active, the encrypted conversational flow as long duration.

18. The one or more computer-readable non-transitory storage media of claim 15, wherein the operation of transmitting the encrypted conversational flow to the egress router comprises transmitting the encrypted conversational flow to a backup egress router.

19. The one or more computer-readable non-transitory storage media of claim 15, the operations further comprising:
   transmitting one or more packets of the encrypted conversational flow over an SD-WAN IPsec tunnel prior to determining whether the encrypted conversational flow exceeds the threshold.

20. The one or more computer-readable non-transitory storage media of claim 15, the operations further comprising:
   removing one or more unencrypted fields from a packet of the encrypted conversational flow prior to sending the encrypted conversational flow to the egress router.

* * * * *